United States Patent
Caballero et al.

(10) Patent No.: US 9,047,914 B1
(45) Date of Patent: Jun. 2, 2015

(54) CONTENT NAVIGATION

(71) Applicant: Amazon Technologies, Inc., Reno, NV (US)

(72) Inventors: Manuel José Dominic Caballero, Romsey (GB); Jonathan Bates, London (GB); James William John Cumberbatch, Brighton (GB); Mark Edwin Hewis, London (GB)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 13/750,651

(22) Filed: Jan. 25, 2013

(51) Int. Cl.
*H04N 5/93* (2006.01)
*H04N 5/917* (2006.01)
*G11B 27/00* (2006.01)
*H04N 9/87* (2006.01)

(52) U.S. Cl.
CPC ............... *G11B 27/005* (2013.01); *H04N 9/87* (2013.01)

(58) Field of Classification Search
CPC . H04N 21/43; H04N 21/432; H04N 21/4325; H04N 5/775
USPC ......... 386/343, 344, 345, 346, 347, 348, 349, 386/350, 351, 352, 353, 326
See application file for complete search history.

(56) References Cited

U.S. PATENT DOCUMENTS

| | | | | |
|---|---|---|---|---|
| 6,658,199 | B1 * | 12/2003 | Hallberg | 386/346 |
| 6,965,724 | B1 * | 11/2005 | Boccon-Gibod et al. | 386/344 |
| 8,699,571 | B2 * | 4/2014 | Bekiares et al. | 375/240.12 |
| 2013/0136428 | A1 * | 5/2013 | Liu | 386/326 |

* cited by examiner

*Primary Examiner* — Daquan Zhao
(74) *Attorney, Agent, or Firm* — Thorpe North & Western

(57) ABSTRACT

Technology is described for navigating content. The method may include receiving instructions for activating a navigation mode in order to navigate through play content. The navigation mode may have a modified frame configuration as compared to the play mode. Navigation content selected from a plurality of navigation content sources may be received. The navigation content may be previously encoded to provide content in a modified frame configuration. The navigation content may be provided for display according to the navigation mode. The play content may be played in response to receiving instructions for activating the play mode.

22 Claims, 10 Drawing Sheets

CONTENT NAVIGATION

BACKGROUND

Increases in network speeds combined with the benefits associated with viewing content from one's own home have resulted in the growing popularity of watching content over a network. For example, a user may watch a movie at home, without having to drive to a video rental store. In addition, the user may avoid being inconvenienced by having to watch the movie at a pre-scheduled time (e.g., during a live television broadcast or according to play times at a movie theater). The ability to watch content over a network at a desired time provides flexibility to the user's schedule. Furthermore, the user may select from a wide variety of content based on individual preference and/or mood. For example, the user may be in the mood to watch a horror movie, and therefore may select from a list of horror movies without having to watch an already scheduled program. The user may also view the latest episode of a favorite television series. In addition, the ability to watch content on a wide variety of devices (e.g., desktop computers, laptop computers, televisions, cell phones, gaming systems, tablet computers) may provide the additional convenience of watching the content in a variety of places (e.g., a coffee place, bookstore, or mall).

In addition to having access to a variety of content, watching content over a network may allow the user to take a break from watching the content, but then return back to the content at a later time. For example, a user may desire to take a break from a movie in order to grab a snack from the kitchen or perform a quick errand. In general, watching content over a network may allow the user to pause the content, and then resume watching the content at a later time. As a different example, the user may stop the movie, switch to a different movie, and then return back to the previous movie at a previous location. In addition, the user may desire to skip certain parts of a program (e.g., a boring scene) and jump to subsequent sections of the movie.

BRIEF DESCRIPTION OF THE DRAWINGS

The accompanying drawings illustrate a number of technology examples. Together with the following description, these drawings demonstrate and explain various examples of the present technology.

DETAILED DESCRIPTION

Figure 1:
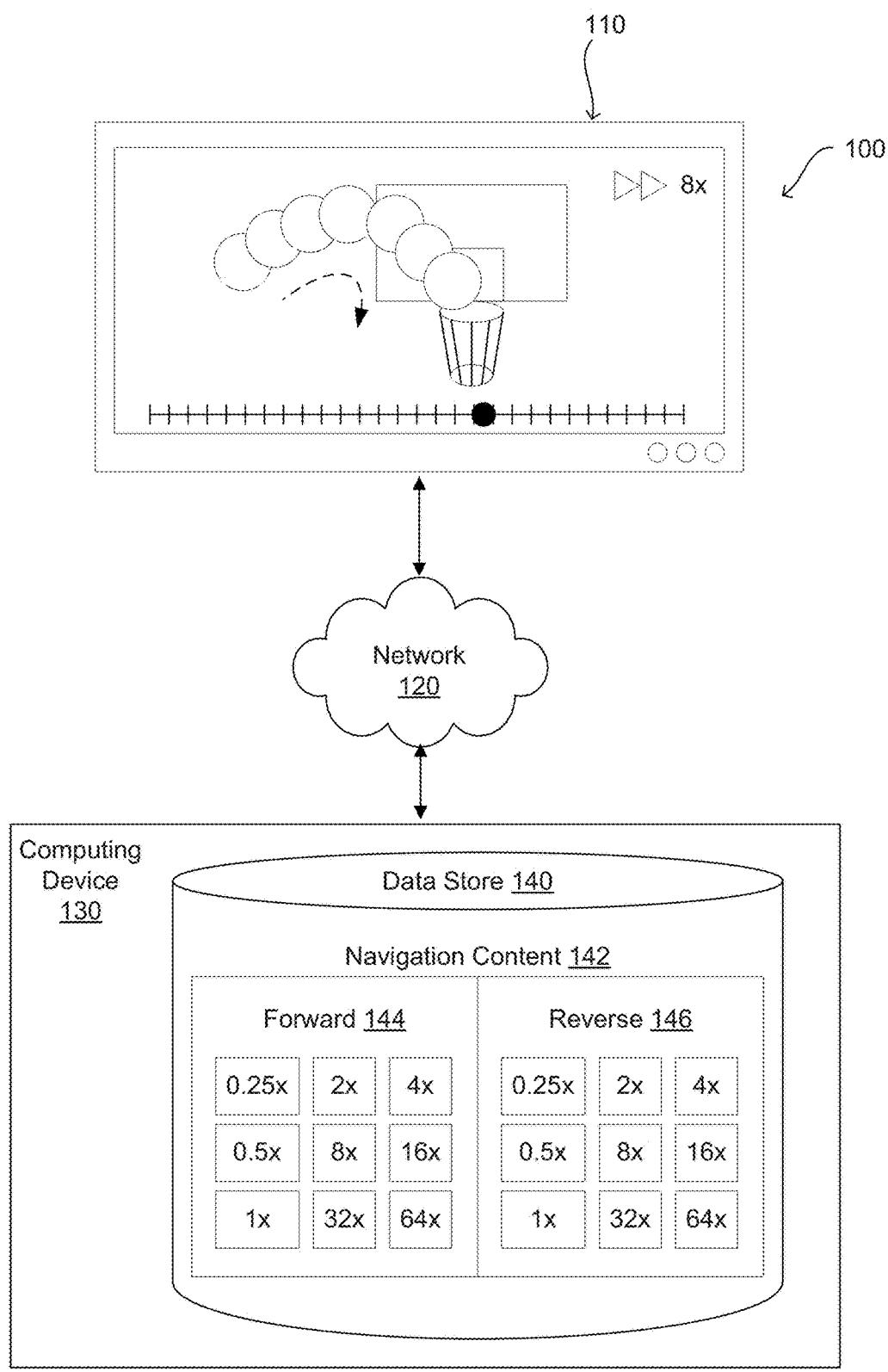
FIG. 1 is an illustration that depicts a system for content navigation according to various examples of the present disclosure.

The technology relates to navigating content obtained over a network in an interactive manner. For example, a user may watch content (e.g., a movie, a television show) on a device connected to a network. The content may be streamed over a network, transmitted in burst mode, partially downloaded, or any other suitable mechanism for transferring content over a network. While watching content, the user may perform a number of actions in order to enhance the viewing experience. For example, the user may desire to skip ahead to a section of the movie or to go back to an earlier section of the movie. The user may have misheard a dialogue spoken by a character and desire to replay the last few seconds of the movie, or the user may desire to watch a particularly exhilarating action sequence in slow motion. In addition, the user may also desire to change the viewing angle of the movie and/or zoom into a specific movie frame. Therefore, the user may desire to navigate the content while watching the movie by forwarding, reversing, zooming, and/or changing the viewing angle. This technology provides the ability for a user to navigate the content that is being received over a network by switching from play content at a play speed (e.g., typical viewing speed) to a navigation mode where separate navigation content is downloaded to provide forwarding, reversing, zooming or changing angles.

In some embodiments of the present technology, the user may initiate one or more navigation modes (e.g., trick modes, scrubbing modes) in order to interactively navigate the streaming content. The interactive navigation may indicate to the user the relative position within the movie by displaying selected frames of the movie along with a time location during the navigation mode. In some examples, the navigation modes may allow the user to navigate the content by forwarding, reversing, replaying, zooming, and/or changing the viewing angle of the content. In addition, the navigation modes may include navigating the content at various desired speeds. For example, the user may forward a program at a speed of 8×, while concurrently viewing fewer frames of the program while forwarding. At a forward speed of 8×, one frame out of every eight frames may be selectively displayed while forwarding, in order to provide the user with an interactive experience. The desired speeds may be defined by N×, where the N may represent a multiplier of a play speed of play content in the play mode. Thus, N may be 2, 3, 4, 5, 8, 12, 16, 19, etc. For example, the various desired speeds may include, but are not limited to, 2×, 3×, 4×, 5×, 8×, 16×, 32×, 64×, and/or 128× the play speed. Therefore, "reverse at 4×" may be considered as a navigation mode. The user may navigate the content at various speeds that are slower than real time. For example, the various speeds may also include, but are not limited to, 0.125×, 0.25×, and/or 0.5× the play speed. In the slow motion mode, frame may be repeatedly shown to slow down the motion. Thus, "slow forward at 0.25×" may also be considered as a navigation mode.

In some examples, the individual navigation modes for content (e.g. a video or music) may be encoded as navigation content and stored as separate downloadable navigation content on a remote server. The navigation content may be encoded at a number of speeds (e.g., 0.25×, 0.5×, 1×, 2×, 4×, 8×, 16×, 32×, 64×) in both the forward and reverse directions. In addition, the navigation modes related to zoom and viewing angle may be encoded as navigation content in a play speed. In some examples, the navigation modes may be encoded at a lower bit rate and/or a lower resolution compared to a play mode. In addition, the navigation modes may be encoded having no audio, therefore reducing the storage impact of the navigation modes.

When a user engages a navigation mode (e.g., switches from playing a movie at play speed to forwarding a movie at 2×), the device may select the appropriate navigation content from navigation content sources stored on the remote server. In this example, the device may select "forward at 2×" navigation content in response to the user forwarding the movie at 2×. If the user switches from forwarding the movie at 2× to forwarding the movie at 4×, a "forward at 4×" navigation mode is engaged. Therefore, "forward at 4×" navigation content may be selected, downloaded and displayed by the device. When the user enters instructions to stop forwarding and play the movie at play speed, the device returns back to a play mode.

The device may identify the time code in the movie when the user engages a navigation mode (e.g., 23:15), and then identify a modified time code based on the navigation mode engaged. For example, the modified time code may be calculated by identifying that the user forwards at 2× for a time period of 30 seconds. According, the movie time code may have increased by sixty seconds, resulting in a modified time code of 24:15. Thus, when the user returns back to the play mode from the navigation mode, the device may resume the movie according to the modified time code.

In some examples, the navigation content and the content streaming in the play mode may be transmitted to a device by using a fragment-based delivery system. The fragment blocks may include blocks of content of various lengths. For example, the fragment blocks may be 0.25 seconds, 0.5 seconds, 1 second, or 2 seconds. Therefore, the various types of navigation content (e.g., forward at 4×) may be transferred to the device as fragment blocks. In some examples, when the user engages a navigation mode, or switches from the navigation mode back to the play mode, there may be a time delay in receiving the content based on the length of the fragment blocks. For example, there may be a time delay of two seconds when engaging a new mode while the device waits to receive the next two-second fragment block. In addition, the navigation content may include fragment blocks encoded at various bit rates. Thus, the device may detect the user's bandwidth and central processing unit (CPU) capacity, and if necessary, adjust the quality of the navigation content by selecting a different bitrate.

FIG. 1 is an illustration that depicts a system 100 for content navigation according to various examples of the present technology. The system 100 may include a device 110 receiving information from a data store 140 over a network 120. The data store 140 may be part of a computing device 130. The data store 140 may include various types of navigation content sources. For example, the data store 140 may include navigation content 142 encoded in a forward 144 and a reverse 146 direction. In addition, the navigation content 142 may be encoded at 2×, 4×, 8×, 16×, 32× and/or 64× speeds. A user may be watching a recorded program (e.g., a documentary) and desire to forward the content at a speed of 8×. When the user engages the "forward at 8×" navigation mode, a request to access the navigation content for "forward at 8×" may be sent to the computing device 130. Thereafter, the "forward at 8×" navigation content may be transferred to the device 110 over the network 120. When the user enters instructions to return back to the play mode (e.g., by pressing a "play" button), a request to access the play content (e.g., 1×) may be sent to the computing device 130. The computing device 130 may accept the request and send the content to the device 110 over the network 120. In some examples, accessing the navigation content 142 by initiating the navigation mode may avoid imposing a decoding load on the device 110 and/or the network 120 for the navigation modes. The device 110 may avoid decoding content faster than real time and extracting image frames from the content to display on the device 110. In addition, the network 120 may avoid downloading content at a rate that may be faster than real time when the user is navigating (e.g., forwarding or reversing) a streaming movie. Since a user's network connections may have constraints on download speeds and/or data usage, downloading content at faster than the play speed may generally be unfeasible. In general, the present technology may not use additional network bandwidth to transfer the navigation content to the device 110.

In the past, navigating content associated with physical media (e.g. DVD, Blu Ray) has provided the user with an interactive experience for navigating content. For example, the user may forward a movie with the ability to view at least some of the movie frames. Similarly, the user may reverse the movie with the ability to view at least some of the movie frames. The ability to view at least some of the movie frames while forwarding or reversing may indicate a relative position within the movie to the user. Based on this viewed position, the user may determine whether to stop reversing or forwarding, and return back to playing the movie at a play speed. In contrast to watching content associated with physical media, current systems that deliver content over a network may lack the ability to view the relative position within the movie during navigation of the movie. For example, a user may be able to drag a cursor forward through a streaming movie, but may be unable to view any of the movie frames between the start and end frames of the dragging operation. Some streaming movies may include a time marker (e.g., 43:15) when dragging to indicate the time within the movie. However, this information may be unhelpful because the user may be unable to mentally connect the time marker with a specific scene of the movie in order to determine the relative position within the movie. In other words, the time marker may be unhelpful for indicating whether the user should stop forwarding or reversing. In addition, current systems that deliver content over a network may have to decode content faster than real time to provide a high speed forward or reverse, thereby using increased processing power. For example, forwarding a movie at a speed of 16× may require the decoder to decode content sixteen times faster than decoding the movie at a play speed.

Figure 2:
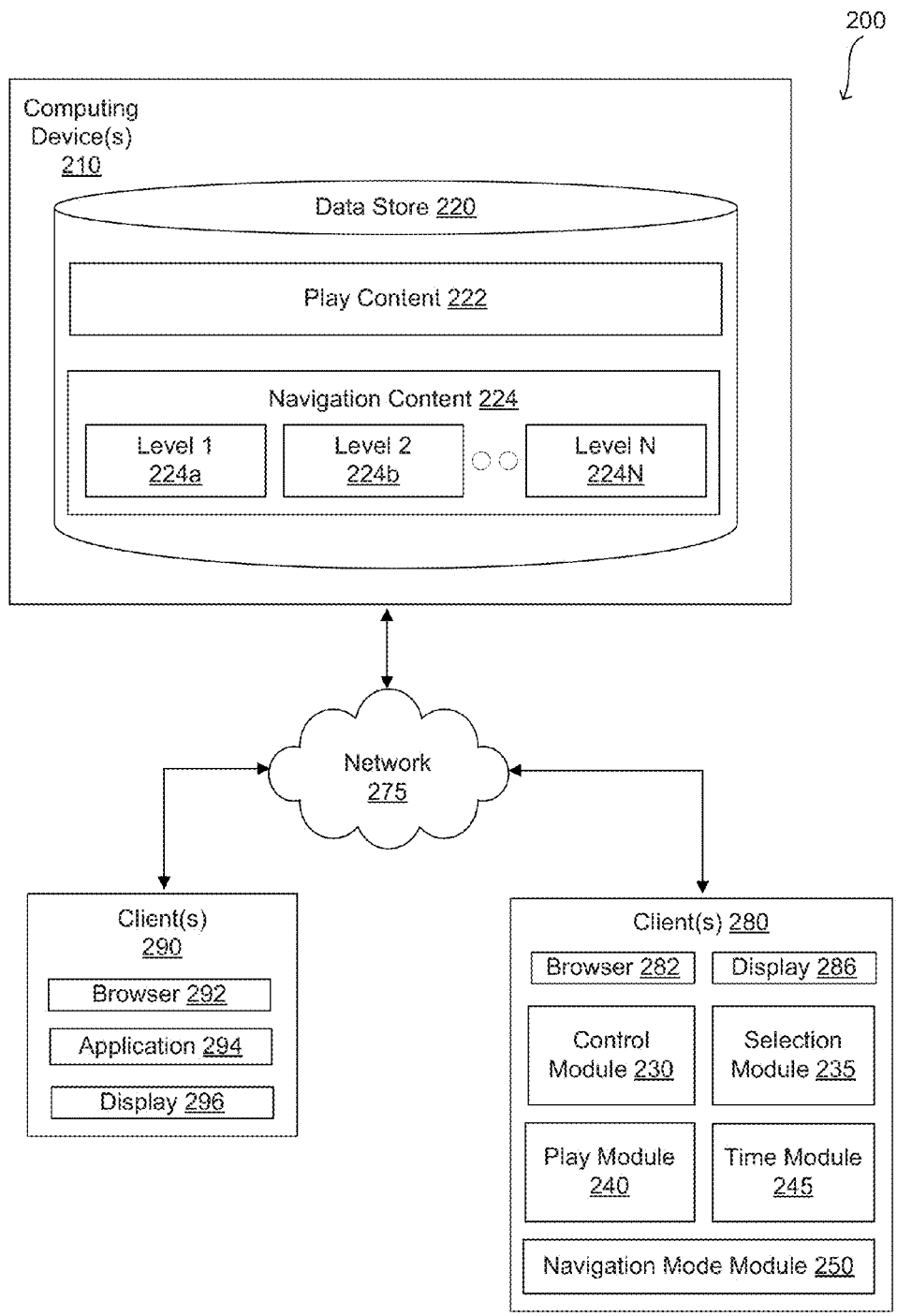
FIG. 2 is an illustration of a networked environment according to various examples of the present disclosure.

In the following discussion, a general description of the system and the system's components is provided, followed by a discussion of the operation of the same. FIG. 2 shows a networked environment 200 according to various examples of the present technology. The networked environment 200 may include one or more computing devices 210 in data communication with a plurality of clients 280 and 290 by way of a network 275. The network 275 may include the Internet, intranets, extranets, wide area networks (WANs), local area networks (LANs), wired networks, wireless networks, or other suitable networks, etc., or any combination of two or more such networks. The networked environment 200 may also include one or more content display devices, such as tablets, laptops, personal computers, cell phones, and so on, which may or may not be coupled to the network 275.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a cloud computing resource, virtualization server, a grid computing resource, and/or any other distributed computing arrangement. Such computing devices 210 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The clients 280 and 290 are representative of a plurality of client devices that may be coupled to the network 275. The clients 280 and 290 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, tablet computer systems, game consoles, electronic book readers, or other devices with like capability. The clients 280 and 290 may include a respective display 286 and 296, as well as a browser 282 and 292. The browser 282 and 292 may be executed on a client 280 and 290, for example, to access and render network pages, such as network pages (e.g. web pages), or other network content served up by the computing device 210 and/or other servers. The display 286 and 296 may comprise, for example, one or more devices such as cathode ray tubes (CRTs), liquid crystal display (LCD) screens, gas plasma-based flat panel displays, LCD projectors, or other types of display devices, etc.

The clients 290 may be configured to execute various applications such as a browser 292, and/or other applications 294. The applications 294 may correspond to code that is executed in the browser 292. The applications 294 may correspond to standalone applications, such as mobile applications. In addition, the client 290 may be configured to execute applications 294 that include, but are not limited to, video playback applications, standalone applications, email applications, instant message applications, and/or other applications.

Various applications and/or other functionality may be executed in the computing device 210 according to various embodiments. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, is associated with the operation of the various applications and/or functional entities described below.

The data stored in the data store 220 may include play content 222, and/or navigation content 224. As used herein, the term "play content" generally refers to content playing in a 1× mode (i.e., content playing in a base resolution and a 1× frame rate, such as 24 to 60 frames per second). In addition, the play content 222 may be played by using substantially all of the frames available (as opposed to playing one out of every two frames, one frame out of four frames, etc.). The play content 222 may be streamed over the network 275 to the clients 280, transferred in a burst mode over the network 275 to the clients 280 and/or transferred in any suitable manner over the network 275 to the clients 280. The play content 222 may include content from a wide variety of audio and/or video sources, such as movies, television shows, programs and/or music. The play content 222 may be categorized by genre (e.g., action, comedy, documentary, kids, science fiction, romance). The play content 222 may be categorized by actors, actresses, directors and producers or by language (e.g., English, Spanish, French, German). In addition, the play content 222 may be categorized by date of release, price, customer ratings and/or editor reviews.

The data stored in the data store 220 may include the navigation content 224. As used herein, the term "navigation content" generally refers to content (e.g., movies, television shows, music, etc.) encoded according to a corresponding navigation mode. In other words, the navigation content 224 may be accessed from the data store 220 when a user engages one of the navigation modes. The navigation content 224 may include play content 222 encoded for reversing, forwarding, zooming, and changing the viewing angle. In addition, the navigation content 224 may include play content 222 encoded at various speeds. For example, the navigation content 224 may be encoded at 0.25× and/or 0.5× the play speed (i.e., slower than the play speed), and the navigation content 224 may be encoded at 2×, 4×, 8×, 16×, 32×, and/or 64× the play speed (i.e., faster than the play speed). As used herein, the term "play speed" generally refers to content playing at a 1× frame rate (e.g., 24 to 60 frames per second) where a user can view and hear the content. In addition, the play speed may play substantially all of the frames included in the play content 222. In contrast, a play speed of 2× may play every other frame in the play content 222, a play speed of 4× may play one frame out of every four frames in the play content 222, etc. The various types of navigation content 224 may be categorized into levels (e.g., level 1 224a, level 2 224b, and level N 224N). For example, the navigation content 224 for forwarding and reversing in 2× may be included in level 1, the navigation content 224 for forwarding and reversing in 4× may be included in level 2, and the navigation content 224 for forwarding and reversing in N× may be in level N. In addition, the movies, television shows, etc. encoded as the navigation content 224 may directly correspond with the movies, television shows, etc. encoded as the play content 222, except that the navigation content 224 may be encoded according to the various navigation modes.

The components executed on the computing device 210 may include a control module 230, a selection module 235, a play module 240, a time module 245, a navigation mode module 250 and other applications, services, processes, systems, engines, or functionality not discussed in detail herein. The control module 230 may be programmed to receive instructions during a play mode to activate a navigation mode. For example, a user may be watching a television program in play mode, but may desire to skip ahead to a later section of the program. In other words, the user may desire to activate the navigation mode of forwarding through the play content 222 in order to reach the desired section. The user may enter instructions to activate the navigation mode by entering instructions into a remote controller (e.g., by pressing a "forward" button). In some examples, the user may enter instructions to forward the play content 222 by using a computer mouse, keyboard, game controller, etc. The user may also enter instructions for reversing the play content 222 at a desired speed (e.g., 2×, 4×), zooming the play content 222, and/or changing the viewing angle of the play content 222. In addition, the navigation mode may have a modified frame configuration compared to the play mode. For example, the frame configuration in the navigation mode may be modified to have a lower frame rate compared to the play mode (e.g., 15 frames per second). The frame configuration in the navigation mode may be modified to have a lower resolution compared to the play mode (e.g., 640×480). In addition, the frame configuration in the navigation mode may exclude audio. After the user enters instructions to switch back to the play mode from the navigation mode, the control module 230 may receive instructions from the user to stop playing the navigation content 224 in the navigation mode and to resume playing the play content 222 in the play mode.

The selection module 235 may be programmed to select the navigation content 224 from a plurality of navigation sources according to the instructions received when activating the navigation mode. In some examples, the navigation content 224 may be selected from a plurality of frame rate sources. The plurality of frame rate sources may include the play content 222 encoded based on a navigation type (e.g., forward, reverse, zoom, angle). In addition, the plurality of frame rate sources may include the play content 222 encoded at various play speeds (e.g., 0.5×, 2×, 4×, 8×). The plurality of frame rate sources may be encoded at separate frame rates. For example, playing content at a speed of 4× may correspond to playing one frame out of every four frames of the play content 222. As another example, playing content at a speed of 8× generally corresponds to playing one frame out of every eight frames of the play content 222. In some examples, the selection module 235 may select the frame rate source based on the instructions received from the user to activate a navigation mode. For example, the user may enter instructions to play a nature documentary at 0.5× the play speed in order to view the detailed scenery in slow motion. Therefore, the selection module 235 may select the frame rate source (e.g. "play at 0.5×") encoded to correspond with the instructions entered by the user from the plurality of frame rate sources.

The play module 240 may be programmed to send the navigation content 224 according to the navigation mode. For example, a user may select a navigation mode for reversing a film at 4×. The play module 240 may send the navigation content 224 based on the user's instructions. The navigation content 224 may be played on a device with a display screen (e.g., television, cell phone, tablet computer, desktop computer, laptop computer). After the user enters instructions to return back to the play mode, the play module 240 may resume sending the play content 222 as adjusted with respect to a modified time code of the play content 222. While send the play content 222 in the play mode (1×), the play module 240 may send substantially every frame included in the play content 222. In other words, the play module 240 may send the play content 222 smoothly and without skipping frames. In contrast, when sending the navigation content 224 according to a navigation mode, the play module 240 may send a frame rate source including a reduced portion of frames when compared to the corresponding play content 222 (e.g., one out of every eight frames in a navigation mode of "reverse at 8×").

The time module 245 may be programmed to identify a time code of the play content in the play mode when receiving instructions for activating the navigation mode. For example, a user may be watching a movie and the user may enter instructions to forward to a later section in the movie. In other words, the user is currently in play mode and enters instructions to engage a navigation mode. The user may enter instructions (e.g., by a remote control device) to forward starting at a time code of 33:55. Thus, the user starts forwarding the movie at a time of 33 minutes and 55 seconds into the movie. The user may forward at a speed of 2× for a desired amount of time. In some examples, neither the network 275 nor a decoder in the device 210 may know that the device 210 may be forwarding through the movie due to the inability to recognize different play modes. Therefore, the time module 245 may calculate the change in time codes within the movie to ensure that the movie returns to the appropriate location when the user returns to playing the movie at a 1× speed. In other words, the time module 245 may determine a modified time code after playing the navigation content according to the navigation mode. Returning to the previous example, the user may start forwarding at a time code of 33:55, and at a speed of 2× the play speed. The user may forward the movie at 2× for a time period of 60 seconds in real time. The time module 245 may calculate that forwarding for 60 seconds in real time at a speed of 2× results is the equivalent of forwarding through 120 seconds of movie time (or two minutes). Therefore, the time module 245 may determine that the modified time code is 35:55. When switching back to the play content, the modified time code may be used by the play module 140 in order to resume playing the movie at the appropriate time code. By ensuring that the change in time codes are identified when switching between the navigation modes and the play modes, the transition between forwarding through the movie and playing the movie at 1× speed may be smooth and fluid to the user.

The navigation mode module 250 may be programmed to store one or more navigation modes when navigating through the play content 222. As used herein, the term "navigation modes" generally refers to a time period when the user is navigating through the play content 222. The term "navigation modes" may also be referred to as "trick modes" and/or "scrubbing modes." When the user selects a navigation mode (e.g., replay at 0.5×), the navigation mode module 250 may store the navigation mode and the navigation content 224 may be delivered by the data store 220. In some examples, the navigation modes may be initiated by the user during a play mode, wherein the term "play mode" generally refers to a mode when the user is playing the content at a 1× frame rate (e.g., 30 frames per second), a pre-defined resolution (e.g., 720×480 DVD resolution), and with audio.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or consumer devices. For example, modules providing services may be considered on-demand computing that is hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 3:
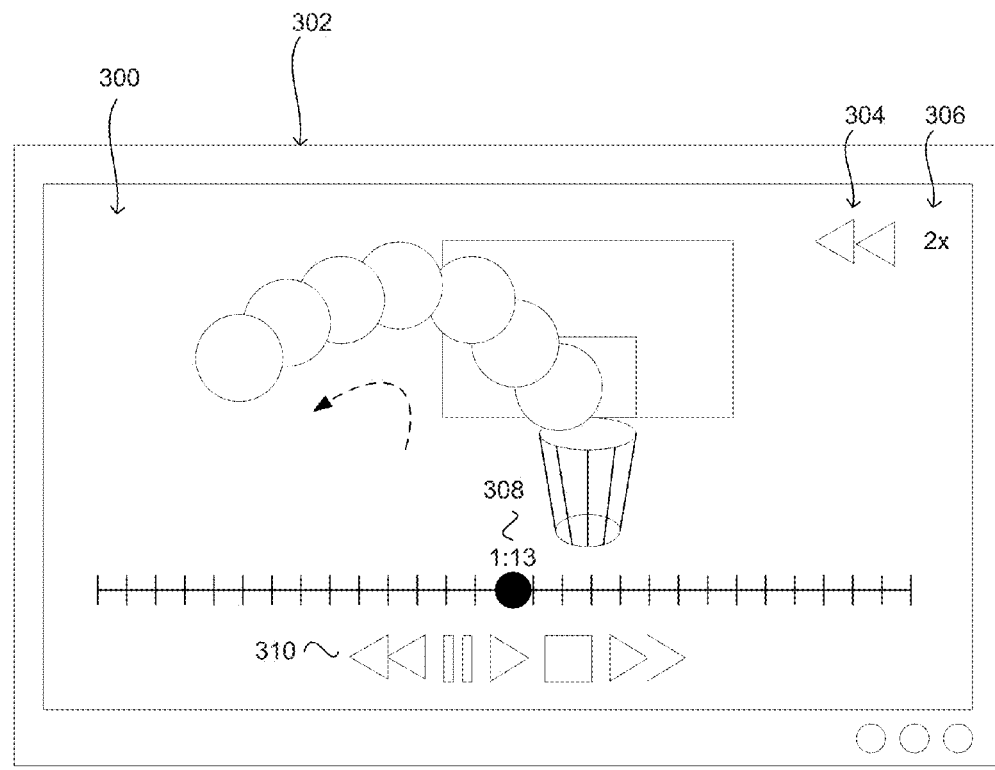
FIG. 3 is a drawing that illustrates an exemplary user interface rendered by various clients according to various examples of the present disclosure.

FIG. 3 is a drawing that illustrates an exemplary user interface 300 rendered by various clients according to various examples of the present disclosure. The user interface 300 may be displayed on a display screen of a device 302 (e.g., television, desktop computer, laptop computer, cell phone, tablet computer). A user 312 may input instructions into an input device 314 in order to navigate content displayed on the device 302. In some examples, the input device 314 may include a remote controller, joystick, keyboard, computer mouse, touch pad, gaming controller, etc. The input device 314 may send the instructions from the user 312 to the device 302. The instructions provided by the user 312 may include instructions to activate a navigation mode. The navigation mode may include, but is not limited to, forwarding the content displayed on the device 302, reversing the content displayed on the device 302, replaying a portion of the content displayed on the device 302, zooming the content displayed on the device 302, and/or changing the viewing angle of the content displayed on the device 302. In addition, the user 312 may input instructions for specifying a desired speed (e.g., 2×, 4×, 8×) when activating the navigation mode.

In some examples, the user interface 300 may display content viewable to the user 312. For example, the content may include, but is not limited to, videos, sports, movies, music, documentaries, television programs, and/or music videos. In this exemplary illustration, the user 312 may be watching a previously recorded classic basketball game on the device 302. The user 312 may have witnessed an amazing shot, but desires to reverse the game for a minute to watch the shot again. The user 312 may press a "reverse" button once on the input device 314, indicating to reverse the video at a reverse speed (e.g., 2×). In some examples, a navigation instruction 304 entered by the user 312 (e.g., reverse) may be displayed on the user interface 300 (e.g., by displaying two arrows pointing left on the display). In addition, a navigation speed 306 (e.g., 2×) may be displayed on the user interface 300 in proximity with the navigation instruction 304. The navigation instruction 304 and the navigation speed 306 may indicate a navigation mode (e.g., reverse 2×) to the user 312. The user interface 300 may include a time bar 308 to indicate a relative position within the video to the user 312. For example, the time bar 308 may indicate that the user 312 has watched one hour and thirteen minutes of the basketball game. In addition, a navigation menu 310 may indicate the available navigation instructions to the user 312. The navigation menu 310 may include icons for the available navigation instructions to the user 312. The user 312 may select from a variety of navigation instructions, such as reverse, pause, play, stop, and/or forward from the navigation menu 310. In some examples, the user 312 may select the navigation instructions by using the input device 314. In addition, the navigation menu 310 may include additional icons for additional navigation modes (e.g., zoom, viewing angle). The navigation menu 310 may be customizable by the user 312 to reflect navigation instructions (e.g., forward at 2×) that are frequently used by the user 312. Thus, by selecting a customized instruction on the navigation menu 310, the device 302 may select a specific navigation content source (e.g., forward at 2×) corresponding to the customized instruction.

Figure 4:
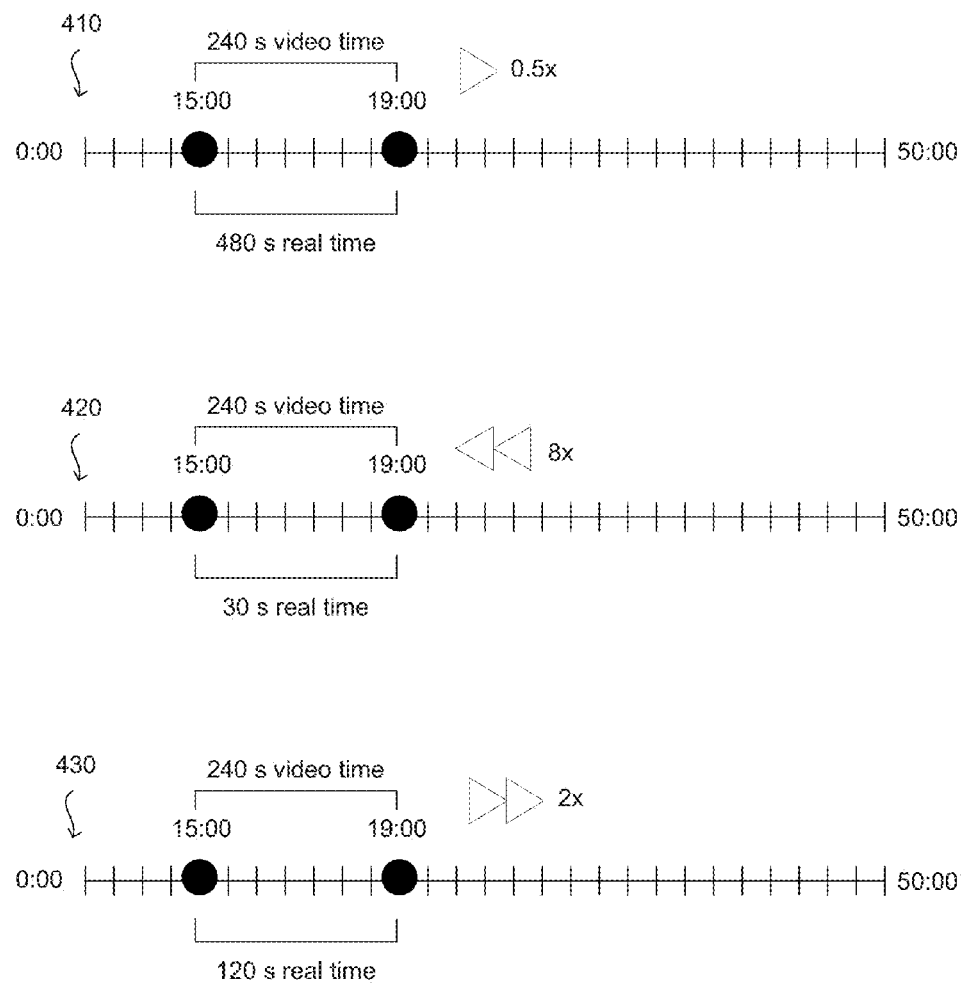
FIG. 4 is a drawing that depicts exemplary time bars according to various examples of the present disclosure.

FIG. 4 is a drawing that depicts exemplary time bars according to various examples of the present disclosure. In an example play mode, the device may be streaming play content and when the user switches to a navigation mode, the device may then stream navigation content. When the user switches back to the 1× play mode, the device switches from streaming the navigation content to streaming the play content. However, the device may ensure that switching between different modes (e.g., switching from navigation mode to the play mode) does not cause the video to be choppy. As a further example, the device may ensure that the transition from forwarding the video to playing the video at 1× play speed is smooth to the eyes of the user. In order to ensure the smooth transition when switching between modes, the device may calculate a modified time code of the content when switching between content sources. For example, according to exemplary time bar 410, the device may identify the time code in the video when the user engages a navigation mode. The user may activate a "play at 0.5×" navigation mode at a time code of 15:00. In general, the device may not recognize the difference in playing content in the play mode (1×) as opposed to playing the content in the navigation mode. Thus, the device may identify a modified time code when the user switches back to the play mode. In order to identify the modified time code, the device may calculate the change in video time since the user activated the navigation mode. In this example, the navigation mode was activated at the time code of 15:00 and includes playing the video at 0.5× for a time period of 480 seconds in real time. Since the video is playing at 0.5×, 480 seconds of real time is equal to 240 seconds of video time. Thus, in order to calculate the modified time code at the end of the navigation mode, the device may multiply the real time (480 seconds) by the speed (0.5×) to find a change in video time (i.e., 240 seconds). The device may add the change in video time (e.g., 240 seconds) to the time code of 15:00 to find the modified time code (i.e., 19:00). Then, the video resumes according to the modified time code (e.g., 19:00) when the user switches from the navigation mode back to the play mode.

The exemplary time bar 420 illustrates a navigation mode (e.g., reverse at 8×) entered at a time code of 19:00. The navigation mode includes reversing a video for a time period of 30 seconds in actual time (or literal time). Since the video is reversing at 8×, 30 seconds of actual time is equal to 240 seconds of video time. Thus, in order to calculate the modified time code at the end of the navigation mode, the device may subtract the change in video time (i.e., 240 seconds) from the initial time code of 19:00, resulting in a modified time code of 15:00. Thus, when switching back to the play mode from the navigation mode, the video resumes at the modified time code of 15:00.

The exemplary time bar 430 illustrates a navigation mode (e.g., forward at 2×) started at time code 15:00. The navigation mode may include forwarding a video for a time period of 120 seconds in actual time. Since the video is forwarding at 2×, 120 seconds of actual time is equal to 240 seconds of video time. Thus, in order to calculate the modified time code at the end of the navigation mode, the device may add the change in video time (i.e., 240 seconds) to the initial time code of 15:00, resulting in a modified time code of 19:00. When switching back to the play mode from the navigation mode, the video may then resume at the modified time code of 19:00.

Figure 5:
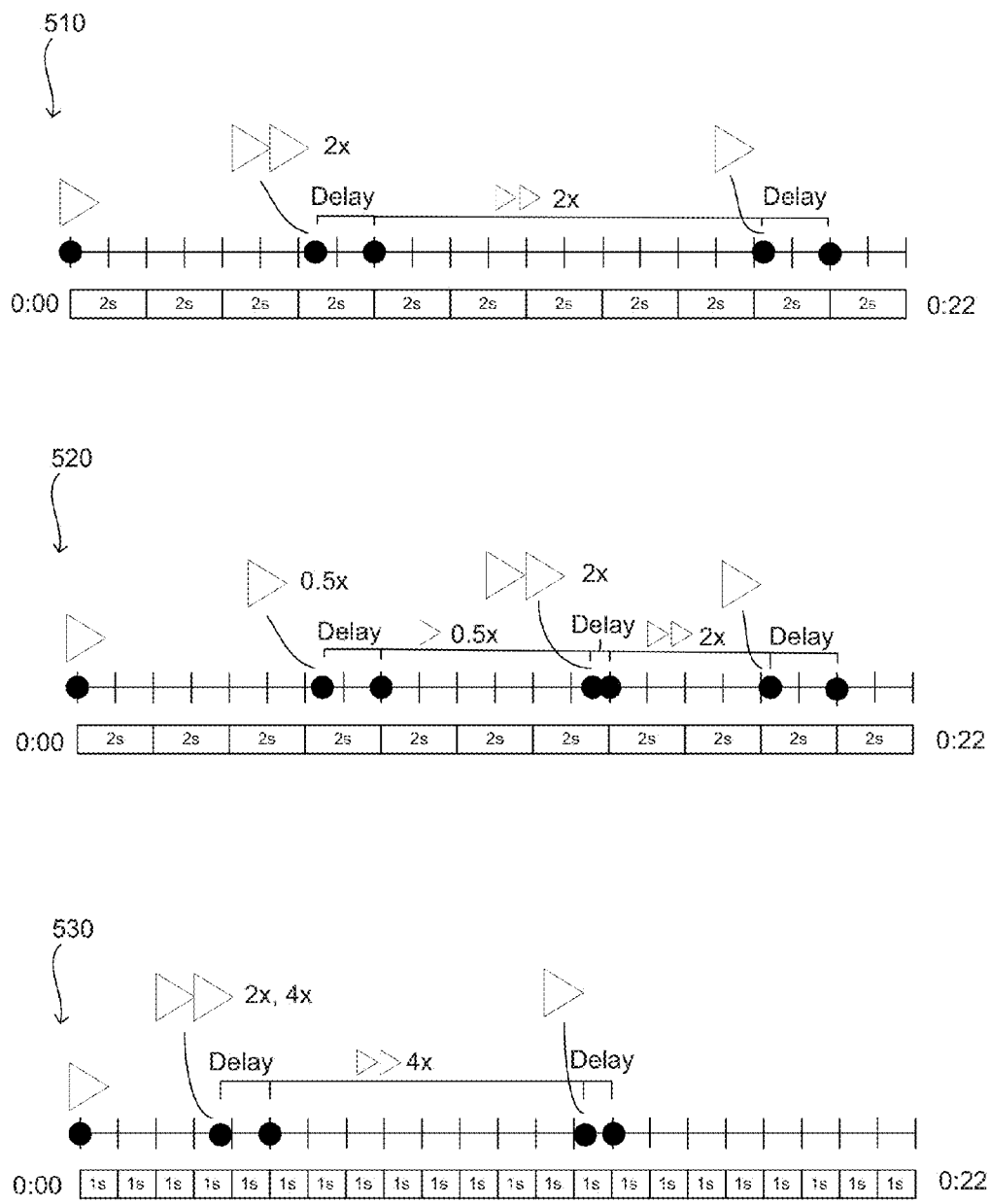
FIG. 5 is a drawing that depicts an exemplary sequence of events performed by various clients according to various examples of the present disclosure.

FIG. 5 is a drawing that depicts an exemplary sequence of events performed by various clients according to various examples of the technology. During the course of watching a video, a user may repeatedly switch between watching the video in a play mode (1×) and watching the video in a navigation mode. For example, the user may reverse, forward, replay, etc. select portions of the video. While in play mode, the device may send fragment blocks from a play content source. In addition, the device may send fragment blocks from a navigation content source during a navigation mode. When the user switches from the play mode to the navigation mode, the device may also switch from sending fragment blocks from the play content source to streaming fragment blocks from the navigation content source. The fragment blocks may include fragments of content in a variety of sizes.

The fragment blocks may range from 0.25 seconds to 2 seconds of content. Each fragment block may be delivered separately and upon verifying that the fragment block arrived within an appropriate time and played back at an expected quality level, the next fragment block may be delivered. A fragment block that does not meet these requirements may cause the next fragment block to be delivered at a lower quality level.

Due to the nature of fragment-based delivery systems, a fragment block may be delivered and played back before a new fragment block is delivered. Thus, attempting to play the new fragment block while a current fragment block is still being or played back may not be allowed. Instead, the new fragment block may have to wait until the current fragment block is finished playing. For example, a video may be delivered in play mode and during a fragment block that is currently being delivered, the user may enter instructions for forwarding the video at a speed of 2×, as shown in 510. In some examples, the device may finish playing the current fragment block before playing a new fragment block received from the navigation content source, in response to the user activating the navigation mode (e.g. forward at 2×). Therefore, there may be a time delay from when the user activates the navigation mode (e.g., presses the forward button) to when the video starts forwarding at 2×. The time delay may depend on the size of the fragment block. For example, the time delay may be up to two seconds when the fragment blocks are each two seconds long. After the video has forwarded for a desired amount of time, the user may enter instructions (e.g. pressing "play") to return the video back to a play mode. If the user presses "play" while the current fragment block is being delivered and/or played, there may be a time delay (lasting up to two seconds for fragment blocks that are 2 seconds long) until the video resumes playing at 1× speed.

As an additional example, a video may be delivered in play mode, as shown in 520. The fragment blocks may be two seconds in length. During a fragment block that is currently being delivered, the user enters instructions to play the video at a speed of 0.5×. The device may finish playing the current fragment block before playing a new fragment block received from the navigation content source, thereby causing a time delay of up to two seconds. After some time, the user may enter instructions to forward the video at a speed of 2×. Again, there may be a time delay of up to two seconds until the fragment blocks from the navigation content source can be streamed according to the navigation mode (e.g., forward at 2×). In addition, there may be a time delay of up to two seconds when the user returns to playing the video at 1× speed.

As an additional example, a video may be delivered in play mode, as shown in 530. The fragment blocks may be one second in length. During a fragment block that is currently being delivered, the user may successively enter a "forward" command twice in order to forward the video at a speed of 4×. However, the user may have entered the first "forward" at the end of a first fragment block and the second "forward" at the beginning of a second fragment block. Therefore, the device may finish playing the second fragment block before playing a new fragment block received from the navigation content source, thereby causing a time delay of up to one second. After some time, the user may return back to a play mode, which may include a time delay of up to one second.

In general, the time delay when transitioning between a play mode and a navigation mode may be reduced by decreasing the size of the fragment blocks. In addition, the time delay may be reduced by lowering the video quality of the fragment blocks and/or removing audio.

In some examples, a fragment block currently playing on a device may be stored in the device's memory. When the user enters instructions to activate a navigation mode (e.g., forward at 2×) while a fragment block is currently playing, the device may extract frames from the fragment block stored in memory in order to interactively forward through the video. In other words, the device may decode the content already stored in the device's memory. So, if the user selects a 2× navigation mode, then every other frame may be extracted from the current fragment block. This may cause the current fragment block to be consumed faster than expected but this provides a faster start for the 2× navigation mode before the new fragment arrives. The device may provide the interactive navigation by decoding the content already stored in memory until the navigation content (e.g., forward at 2×) is delivered to the device. By using frames already stored in memory, the time delay visible to the user in playing the new fragment blocks may be decreased.

In an alternative example, the device may reduce the time delay by caching a pre-determined number of fragment blocks in the reverse and forward directions compared to a play marker. For example, the device may cache the preceding two fragment blocks, as well as the following two fragment blocks. Thus, upon receiving instructions to enter a navigation mode, the fragment blocks stored in the cache may be accessed by the device while new fragment blocks (based on the navigation mode selected by the user) are delivered to the device. Once the fragment blocks are delivered, the device may switch from the fragment blocks stored in the cache to the new fragment blocks.

In a further configuration, the device may store preceding and/or succeeding fragment blocks for a selected trick mode with respect to the current fragment block being delivered in the cache by using heuristics. For example, the device may determine that the user has previously forwarded the play content at 2×. Thus, by using heuristics, the device may preemptively store a predetermined number of frames of the "forward at 2×" navigation content in the cache in anticipation of the user forwarding the content at 2× again.

Figure 6:
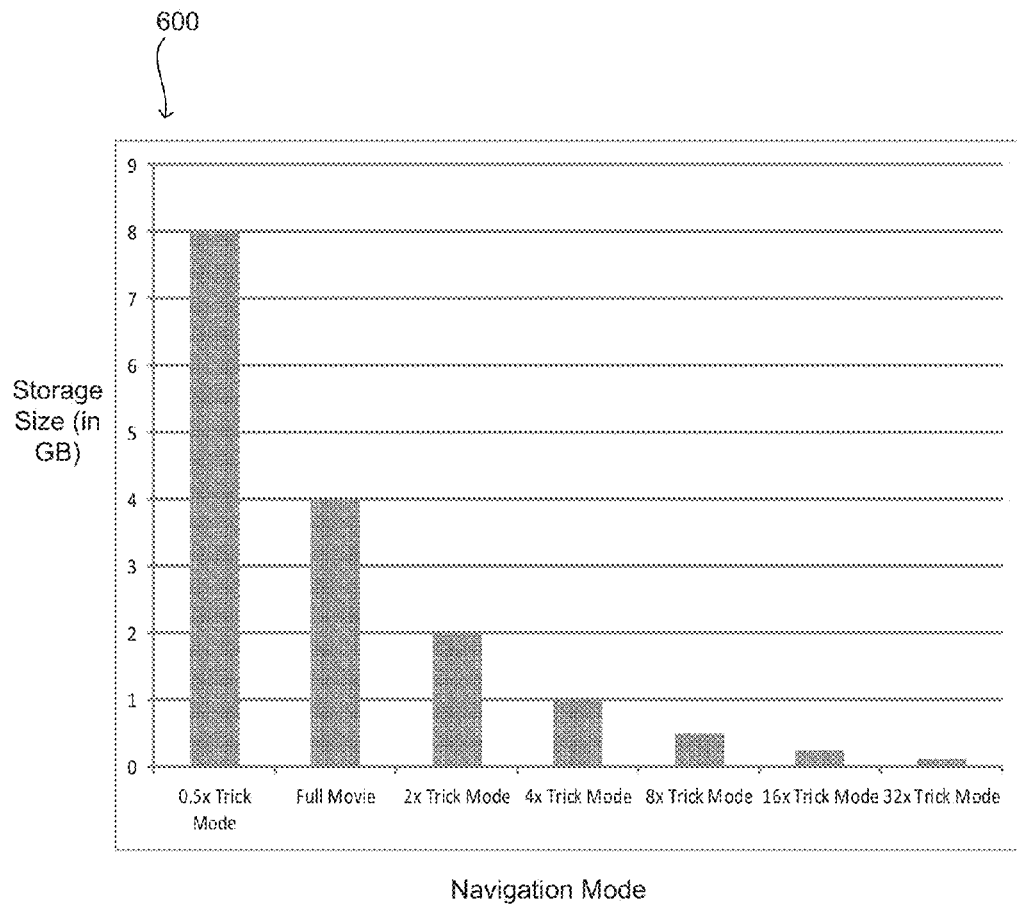
FIG. 6 is a graph showing exemplary storage sizes for content according to various examples of the present disclosure.

FIG. 6 is a graph 600 showing exemplary storage sizes for content according to various examples of the present disclosure. For example, the storage size of a video may be approximately 4 gigabytes (GB). However, the storage size of the navigation content may be significantly lower than the storage size of the video. For example, forwarding or reversing the movie at a speed of 2× may display every second frame to the user as compared to playing the movie in a play mode. Therefore, the navigation content for a speed of 2× (in either the forward or reverse direction) may be approximately one-half the storage size of the full movie (i.e., 2 GB). In some examples, the navigation content for a speed of 2× may be less than one-half of the storage size of the full movie, due to the navigation content being encoded at a lower bitrate and with no audio as compared to the full movie. For example, the navigation content for a speed of 2× may be approximately one-third the storage size of the full movie or even less. Since forwarding or reversing the movie at a speed of 4× may display every fourth frame to the user as compared to playing the movie in the play mode, the storage size may be approximately one-fourth the storage size of the full movie (i.e., 1 GB). With each additional navigation mode, the storage size of the navigation content may be reduced by approximately one-half as compared with the previous navigation mode. Therefore, the storage size for each navigation mode (e.g., reverse, forward) for all desired speeds (e.g., 2×, 4×, N×) may be twice the storage size of the full movie (e.g., 8 GB).

Figure 7A:
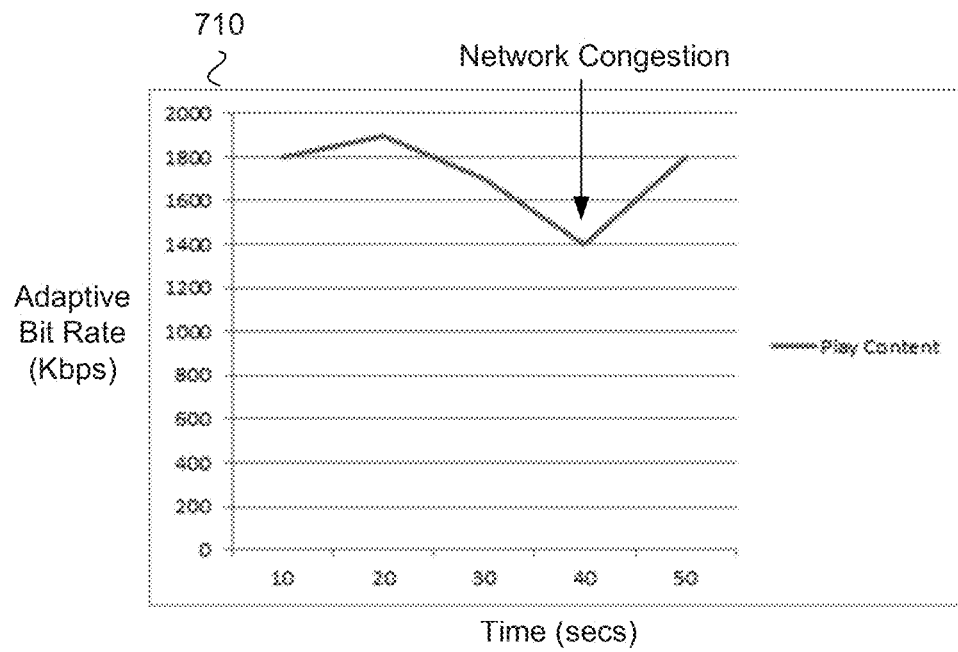
FIGS. 7A and 7B are graphs showing exemplary adaptive bit rates for the play mode and the navigation mode according to various examples of the present disclosure.
Figure 7B:
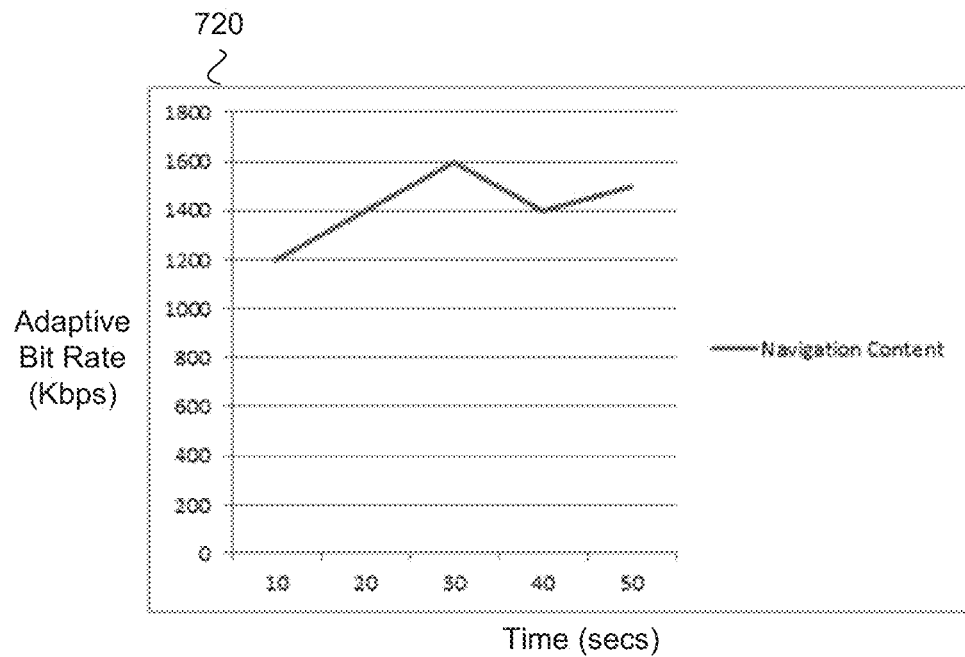

FIGS. 7A and 7B are graphs showing exemplary adaptive bit rates for the play mode and the navigation mode according to various examples. As previously discussed, the play content and/or the navigation content may be delivered to the device as fragment blocks. In addition, the adaptive bit rate of the fragment blocks may vary depending on the user's bandwidth and/or central processing unit (CPU) capacity. In other words, the quality of the video stream may be adjusted based on the network availability and/or processing power. One reason for a user's decreased bandwidth may include network congestion (e.g., a large number of users may be using the network).

In some examples, a device may request and receive a fragment block from a content source at a first bitrate. If the first bitrate of the fragment block received is lower than a download speed of the device, the device may request a fragment block at a second bitrate, where the second bitrate is higher than the first bitrate. If the second bitrate of the fragment block received is higher than the download speed of the device, the device may request a fragment block at a lower bitrate as compared with the second bitrate. By adjusting the bitrate of the fragment blocks, the device may decrease buffer times when playing the fragment blocks at times when the network is congested. In addition, adjusting the bitrate of fragment blocks may benefit users with high-speed connections and/or increased bandwidth, as content may be delivered at a higher video quality. Thus, the quality of the play content and/or the navigation content may be maximized based on the device's processing capability and the network.

The graph 710 shows exemplary adaptive bit rates for transferring play content to a device from a play content source. For example, the bitrate may be 1800 Kbps and gradually increase to 1900 Kbps when the user's bandwidth increases. Subsequently, network congestion may reduce the user's bandwidth and the bitrate may decrease to 1400 Kbps before the bitrate increases again to 1800 Kbps. The graph 720 shows exemplary adaptive bit rates for transferring navigation content to a device from a navigation content source. For example, the bitrate may be 1200 Kbps and gradually increase to 1600 Kbps. Subsequently, network congestion and/or decreased processing capacity may decrease the bitrate to 1400 Kbps before the bitrate increases to 1500 Kbps. This technology may select fragment blocks for playback of desired play content or navigation content at varying speeds in conjunction with adjustments for quality using adaptive bit rates.

Figure 8:
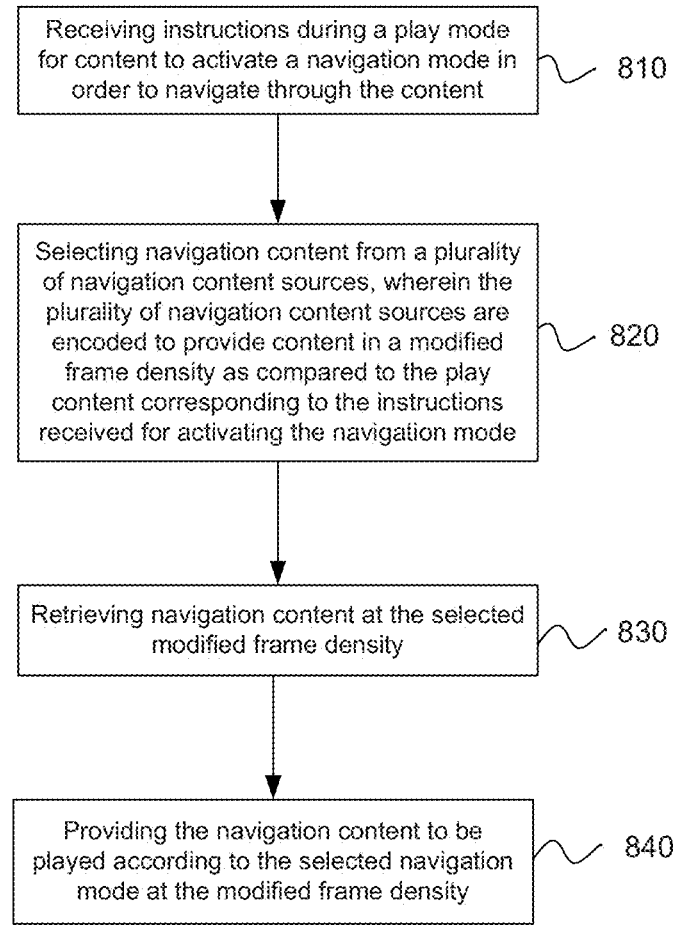
FIG. 8 is a flowchart of an example method for navigating content using a computing device in the networked environment of FIG. 2.

FIG. 8 illustrates an example of a method for navigating content. The method may include the operation of receiving instructions during a play mode to activate a navigation mode in order to navigate through play content, as in block 810. For example, a user may be watching a movie in play mode, but may desire to skip ahead to the end of the movie. In other words, the user may desire to activate the navigation mode (e.g., forward at 64×) in order to skip ahead to the end of the movie. The user may enter the instructions to activate the navigation mode into a remote controller (e.g., by pressing a "forward" button a certain number of times). In some examples, the user may enter instructions to activate the navigation mode by using a computer mouse, keyboard, game controller, etc. The navigation mode may include, but is not limited to, forwarding, reversing, replaying, zooming and/or changing the viewing angle of the play content.

Navigation content may be selected from a plurality of navigation content sources. The plurality of navigation content sources may be encoded to provide content in a modified frame density as compared to the play content and the navigation content selected may correspond to the instructions received for activating the navigation mode, as in block 820. The plurality of navigation content sources may include play content encoded according to a navigation type (e.g., forward, reverse, zoom, viewing angle). In addition, the plurality of navigation content sources may include play content encoded at various speeds (e.g., 0.5×, 2×, 4×, 8×). The plurality of navigation content sources may be encoded according to the navigation frame density and/or a desired bitrate. In general, navigation modes play a portion of the total frames as compared to substantially the entire content played in play modes (e.g., forwarding a video at a speed of 4× displays one out of every four frames as compared to a play mode). Thus, the navigation content may have a modified frame density as compared to the play content. The modified frame density may enable forwarding, reversing, replaying, zooming, and/or changing a viewing angle at a desired speed. In some examples, the modified frame density may have a lower frame rate and/or resolution as compared to the play content. In addition, the modified frame density may exclude audio.

The navigation content may be retrieved at the selected modified frame density, as in block 830. In some examples, the navigation content may be retrieved at a device (e.g., smart phone, laptop computer, television). In addition, the navigation content may be retrieved based on a user's instructions for activating a navigation mode.

The navigation content to be played may be provided according to the selected navigation mode at the modified frame density, as in block 840. For example, a user may select a navigation mode of reversing a film at a speed of 4×, and the navigation content may be provided according to the user's instructions. The navigation content may be played on a device with a display screen (e.g., television, cell phone, tablet computer, desktop computer, laptop computer). In addition, the play content may be played on the device after the user enters instructions to return back to the play mode. In some examples, providing the play content and/or navigation content may be subject to a quantization time representing a delay in retrieving the play content and/or navigation content at the modified frame density.

Figure 9:
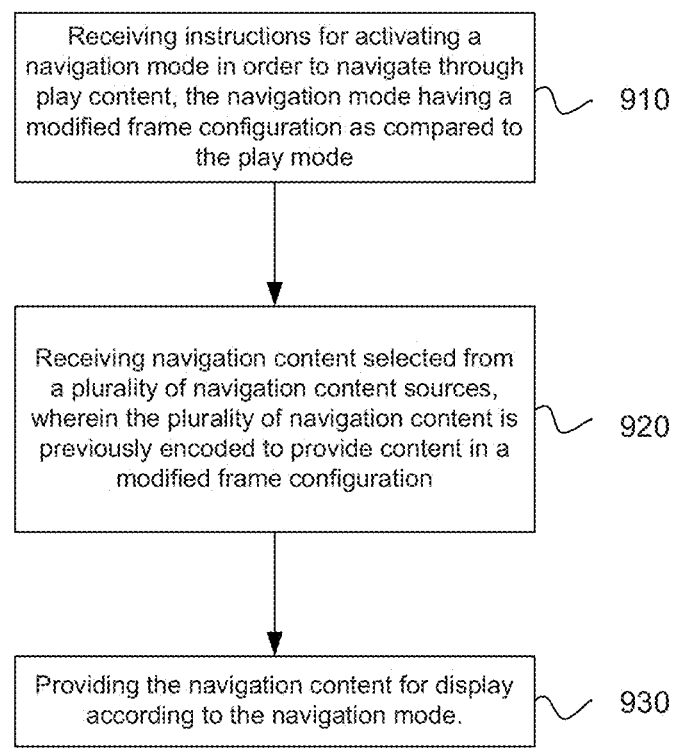
FIG. 9 is a flowchart of another example method for navigating content using a computing device in the networked environment of FIG. 2.

FIG. 9 illustrates an example of a method for navigating content. The method may include the operation of receiving instructions for activating a navigation mode in order to navigate through play content, the navigation mode having a modified frame configuration as compared to the play mode, as in block 910. The navigation mode may include a first trick mode and a second trick mode in order to forward, reverse, replay, zoom and/or change a viewing angle of play content. In addition, the navigation mode may enable the forwarding, reversing and/or replaying of content according to a desired speed (e.g., 0.25×, 0.5×, 2×, 4×, 8×, 16×, 32× and/or 64×). The navigation content may have a modified frame configuration as compared to the play content. The modified frame configuration may enable forwarding, reversing, replaying, zooming, and/or changing a viewing angle at a desired speed. In some examples, the modified frame configuration may have a lower frame rate and/or resolution as compared to the play content. In addition, the modified frame configuration may exclude audio.

Navigation content selected from a plurality of navigation content sources may be received, wherein the plurality of navigation content is previously encoded to provide content in a modified frame configuration corresponding to the instructions received for activating the navigation mode, as in block 920. In some examples, the plurality of navigation content may be encoded according to the navigation mode and a desired bitrate. In addition, the navigation content may be encoded at a lower bitrate than the play content and exclude audio.

The navigation content may be provided to the display according to the navigation mode, as in block 930. The display may be included in a television, cell phone, tablet computer, desktop computer, laptop computer, etc. In addition, the play content may be played in response to receiving instructions for returning to the play mode. In some examples, the play content and the navigation content may be played according to adaptive bitrate streaming. In addition, the play content and the navigation content may be played using fragment blocks. For example, the fragment blocks may have a time duration in a time range of 0.25 seconds to 3 seconds. In some examples, the transition from playing the play content in the play mode to playing the navigation content according to the navigation mode may use a quantization time based on a time delay while the fragment blocks are being obtained. In addition, the transition from playing the navigation content according to the first trick mode to playing the navigation content according to the second trick mode may use a quantization time based on a time delay while the fragment blocks are being obtained. For example, the first trick mode may include "forward at 2×" and the second trick mode may include "forward at 4×." Therefore, when the video switches from forwarding at a speed of 2× to forwarding at a speed of 4×, there may be a quantization time that represents the delay while the fragment blocks for the second trick mode (i.e., the fragment blocks for the second trick mode content) are being obtained.

In some examples, a time code of the play content in the play mode may be identified when receiving instructions for activating the navigation mode. A modified time code may be determined after playing the navigation content according to the navigation mode. The play content may be played in the play mode as adjusted with respect to the modified time code of the play content. In addition, instructions may be received while playing the navigation content according to the first trick mode for activating a second trick mode. The navigation content may be selected from the plurality of navigation content sources previously encoded according to the second trick mode. Subsequently, the navigation content may be played according to the second trick mode. For example, the user may enter instructions to reverse a video at a speed of 4×, and then subsequently enter instructions to reverse the video at a speed of 8×.

Figure 10:
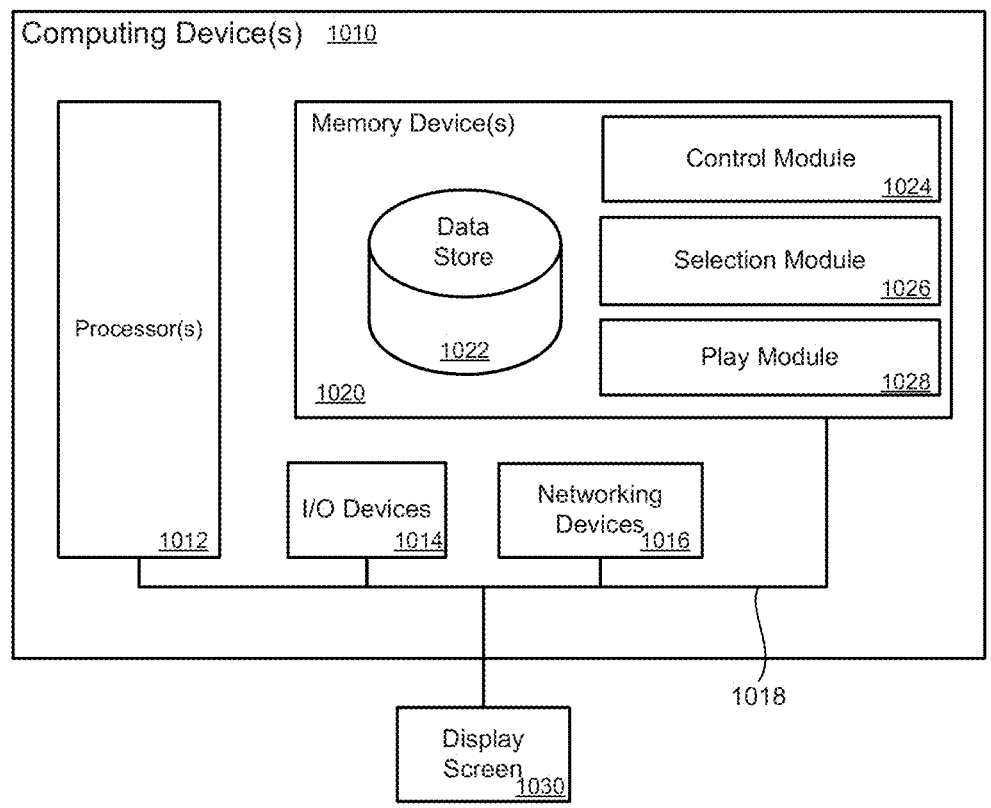
FIG. 10 is a schematic block diagram that provides an example illustration of a computing device that may be employed in the networked environment of FIG. 2.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules that are executable by the processor(s) 1012 and data for the modules. Located in the memory device 1020 are modules executable by the processor. For example, a control module 1024, a selection module 1026, and the play module 1028, and other modules may be located in the memory device 1020. The modules may execute the functions described earlier. A data store 1022 may also be located in the memory device 1020 for storing data related to the modules and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen 1030 that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.\

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for navigating content, the method comprising:
    under the control of one or more computer systems configured with executable instructions:
        receiving instructions during a play mode to activate a navigation mode in order to navigate through play content, the instructions received at a defined time code of the play content;
        selecting navigation content at a fragment block that corresponds to the defined time code of the play content from a plurality of navigation content sources, wherein the plurality of navigation content sources are encoded to provide content, in a modified frame density as compared to the play content, corresponding to the instructions received for activating the navigation mode;
        retrieving the navigation content at the selected modified frame density;
        providing the navigation content over a network according to the selected navigation mode at the modified frame density, the navigation content to be provided starting from the fragment block that corresponds to the defined time code of the play content;
        receiving instructions after a defined period of time to stop providing the navigation content in the navigation mode and switch back to the play content in the play mode;
        determining a modified time code at which to resume providing the play content in the play mode, the modified time code being calculated based on a type of navigation mode and the defined period of time between starting to provide the navigation content and receiving the instructions to switch back to the play content; and
        providing the play content in the play mode as adjusted with respect to the modified time code of the play content.

2. The method of claim 1, wherein the modified frame density of the navigation mode enables at least one of:
    forwarding the content at a desired speed;
    reversing the content at the desired speed; and
    replaying a portion of the content at the desired speed.

3. The method of claim 2, wherein the desired speed is N×, the N× representing a multiplier of a play speed of play content in the play mode.

4. The method of claim 1, wherein the plurality of navigation content sources are encoded according to a navigation frame density and a desired bitrate.

5. The method of claim 1, wherein providing the play content in response to receiving instructions for returning to the play mode is subject to a quantization time representing a delay in receiving the play content.

6. A method for navigating content, the method comprising:

under the control of one or more computer systems configured with executable instructions:
receiving instructions for activating a navigation mode in order to navigate through play content, the navigation mode having a modified frame configuration as compared to the play mode, the instructions being received at a defined time code of the play content;
receiving navigation content selected from a plurality of navigation content sources, the navigation content being received at a position that corresponds to the defined time code of the play content, the plurality of navigation content sources being previously encoded to provide content in a modified frame configuration;
providing the navigation content for display over a network according to the navigation mode, the navigation content to be provided starting from the position that corresponds to the defined time code of the play content;
receiving instructions after a defined period of time to stop providing the navigation content and resume playing the play content;
determining a modified time code at which to resume providing the play content, the modified time code being calculated based on a type of navigation mode and the defined period of time between starting to provide the navigation content and receiving the instructions to switch back to the play content; and
providing the play content as adjusted with respect to the modified time code.

7. A method of claim 6, wherein the navigation mode includes a first trick mode and a second trick mode, wherein the first trick mode and second trick mode are enabled to:
forward the content at a desired speed;
reverse the content at the desired speed; and
replay a portion of the content at the desired speed.

8. The method of claim 7, further comprising:
receiving instructions while providing the navigation content according to the first trick mode for activating a second trick mode;
selecting the navigation content from the plurality of navigation content sources previously encoded according to the second trick mode; and
providing the navigation streaming content according to the second trick mode.

9. The method of claim 7, wherein the desired speed is at least one of a 0.25×, 0.5×, 2×, 4×, 8×, 16×, 32×, and 64× of a play speed in the play mode.

10. The method of claim 6, wherein the navigation content is encoded according to the navigation mode and a desired bitrate.

11. The method of claim 6, wherein the play content and the navigation content are played according to adaptive bitrate streaming.

12. The method of claim 6, wherein the play content and the navigation content are played using fragment blocks each having a time duration in a time range of 0.25 seconds to 3 seconds.

13. The method of claim 12, further comprising transitioning from providing the play content in the play mode to providing the navigation content according to the navigation mode by using a quantization time based on a time delay while the fragment blocks are being obtained.

14. The method of claim 12, further comprising transitioning from providing the navigation content according to the first trick mode to providing the navigation content according to the second trick mode that uses a quantization time based on a time delay while the fragment blocks are being obtained.

15. The method of claim 6, wherein the navigation content in the navigation mode has no audio and is encoded at a lower bitrate than the play content.

16. The method of claim 6, tangibly embodied as computer-executable instructions on at least one computer-readable medium.

17. A system for navigating content, the system comprising:
a processor;
a memory device including instructions that, when executed by the processor, cause the processor to execute:
a control module configured to receive instructions during a play mode to activate a navigation mode to navigate content, the navigation mode having a modified frame configuration compared to the play mode, the instructions received at a defined time code of the content;
a selection module configured to select navigation content at a fragment block that corresponds to the defined time code of the content from a plurality of frame rate sources according to the instructions received when activating the navigation mode; and
a play module configured to send the navigation content over a network according to the navigation mode, the navigation content to be sent starting from the fragment block that corresponds to the defined time code of the content, wherein
the control module is further configured to receive instructions after a defined period of time to stop providing the navigation content in the navigation mode and switch back to the play content in the play mode;
a time module is configured to determine a modified time code at which to resume providing the play content in the play mode, the modified time code being calculated based on a type of navigation mode and the defined period of time between starting to provide the navigation content and receiving the instructions to switch back to the play content; and
the play module is further configured to provide the play content in the play mode as adjusted with respect to the modified time code of the play content.

18. The system of claim 17, wherein each frame rate source in the plurality of frame rate sources has a separate frame rate speed.

19. The system of claim 17, wherein the play module is further configured to play substantially every frame included in the content during play mode.

20. The system of claim 17, wherein the navigation mode is enabled for at least one of:
forwarding the content at a desired speed;
reversing the content at the desired speed; and
replaying a portion of the content at the desired speed;
wherein the desired speed is N×, the N× representing a multiplier of a play speed of play content in the play mode.

21. The system of claim 17, wherein the play content and the navigation content are played according to adaptive bitrate streaming.

22. The system of claim 17, wherein the play content and the navigation content are played using fragment blocks each having a time duration of at least one of 0.25 seconds, 0.5 seconds, 1 second, or 2 seconds.

* * * * *